United States Patent
Blott et al.

(10) Patent No.: US 11,126,852 B2
(45) Date of Patent: Sep. 21, 2021

(54) METHOD FOR TRAINING A PERSON RECOGNITION MODEL USING IMAGES FROM A CAMERA, AND METHOD FOR RECOGNIZING PERSONS FROM A TRAINED PERSON RECOGNITION MODEL BY MEANS OF A SECOND CAMERA IN A CAMERA NETWORK

(71) Applicant: Robert Bosch GmbH, Stuttgart (DE)

(72) Inventors: Gregor Blott, Salzgitter (DE); Sascha Florian Lange, Hildesheim (DE)

(73) Assignee: Robert Bosch GmbH, Stuttgart (DE)

( * ) Notice: Subject to any disclaimer, the term of this patent is extended or adjusted under 35 U.S.C. 154(b) by 55 days.

(21) Appl. No.: 16/267,455

(22) Filed: Feb. 5, 2019

(65) Prior Publication Data

US 2019/0244026 A1    Aug. 8, 2019

(30) Foreign Application Priority Data

Feb. 7, 2018   (DE) .................. 10 2018 201 914.2

(51) Int. Cl.
*G06K 9/00*  (2006.01)
*H04N 5/232*  (2006.01)
(Continued)

(52) U.S. Cl.
CPC ..... *G06K 9/00677* (2013.01); *G06K 9/00523* (2013.01); *G06K 9/00536* (2013.01);
(Continued)

(58) Field of Classification Search
CPC ........... G06K 9/00362; G06K 9/00523; G06K 9/00536; G06K 9/00677; G06K 9/00771;
G06K 9/6271; G06T 7/20; G06T 2207/30232; G06T 2207/30241; H04N 5/232; H04N 5/23206; H04N 5/232061;
(Continued)

(56) References Cited

U.S. PATENT DOCUMENTS

| 10,636,173 B1 * | 4/2020 | Beach .................. H04N 17/002 |
| 2006/0197839 A1 * | 9/2006 | Senior .............. H04N 5/232935 348/169 |

(Continued)

FOREIGN PATENT DOCUMENTS

DE   102009055127   6/2011

*Primary Examiner* — Katrina R Fujita
(74) *Attorney, Agent, or Firm* — Michael Best & Friedrich LLP

(57) ABSTRACT

A method for training a person recognition model using images from a camera 100, wherein the method has at least a reading-in step in which a detection signal 135 representing a detected person within a monitoring area of at least the camera 100 in a camera network is read in. The method also has at least a collecting step in which a plurality of image signals 140 from the camera 100 are collected using the detection signal 135 which has been read in, wherein the collected image signals 140 represent a recorded image section from each image from the camera 100. Finally, the method has at least an adapting step in which the person recognition model is adapted using the collected image signals 140 in order to recognize the detected person in an image from the camera 100 or from an at least second camera in the camera network.

12 Claims, 4 Drawing Sheets

(51) Int. Cl.
*G08B 13/196* (2006.01)
*G06N 20/00* (2019.01)
*G06N 3/08* (2006.01)
*G06T 7/20* (2017.01)
*H04N 5/247* (2006.01)

(52) U.S. Cl.
CPC ............... *G06N 3/08* (2013.01); *G06N 20/00* (2019.01); *G06T 7/20* (2013.01); *G08B 13/196* (2013.01); *H04N 5/232* (2013.01); *H04N 5/23206* (2013.01); *H04N 5/23219* (2013.01); *H04N 5/232061* (2018.08); *H04N 5/247* (2013.01); *G06T 2207/30241* (2013.01)

(58) Field of Classification Search
CPC .. H04N 5/23219; H04N 5/247; G08B 13/196; G08B 13/19613; G08B 25/08
See application file for complete search history.

(56) References Cited

U.S. PATENT DOCUMENTS

| | | | |
|---|---|---|---|
| 2009/0175500 A1* | 7/2009 | Kizuki | G06T 7/277 382/103 |
| 2010/0092033 A1* | 4/2010 | Krishnaswamy | F41G 3/06 382/103 |
| 2010/0092079 A1* | 4/2010 | Aller | B42D 15/00 382/165 |
| 2012/0328153 A1 | 12/2012 | Yu et al. | |
| 2013/0155247 A1* | 6/2013 | Wang | H04N 9/735 348/159 |
| 2017/0262962 A1* | 9/2017 | Rad | G06T 3/4046 |
| 2018/0018778 A1* | 1/2018 | Haverkamp | G01B 21/042 |
| 2018/0268255 A1* | 9/2018 | Surazhsky | G06N 3/08 |
| 2018/0268256 A1* | 9/2018 | Di Febbo | G06K 9/6211 |
| 2019/0243376 A1* | 8/2019 | Davis | H04N 5/247 |
| 2019/0244030 A1* | 8/2019 | Yoshinaga | G06T 7/246 |
| 2020/0151692 A1* | 5/2020 | Gao | G06K 9/6255 |

* cited by examiner

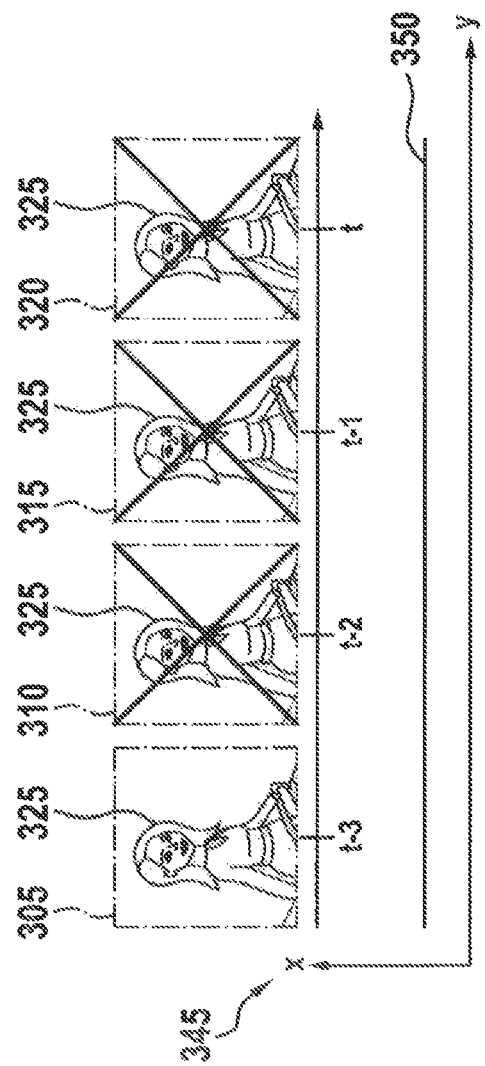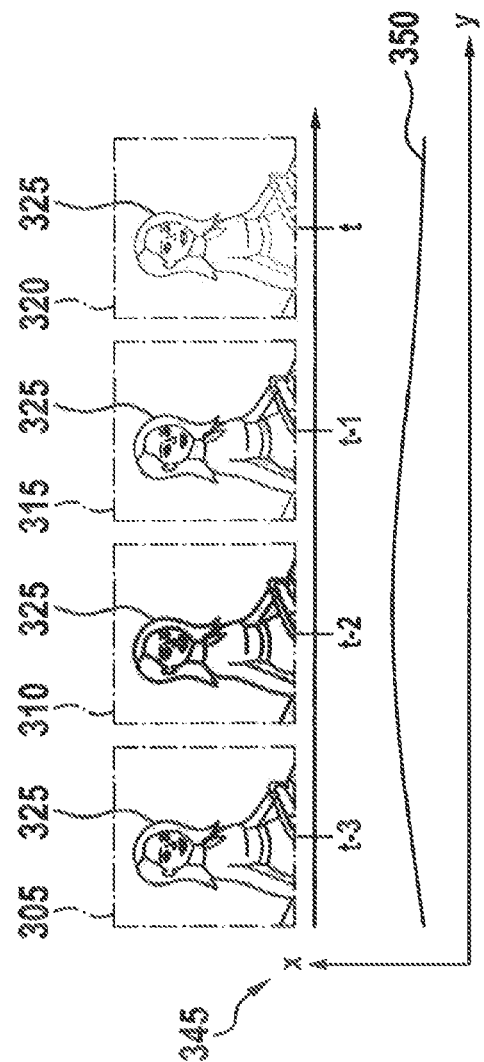
Fig. 3
Fig. 4
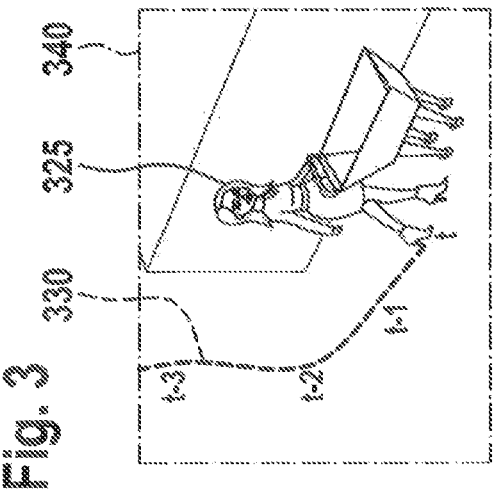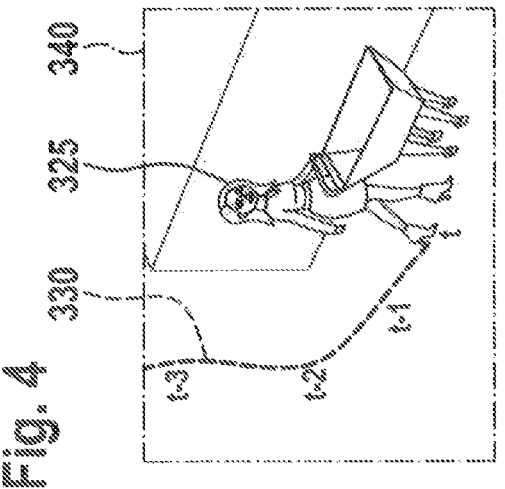

METHOD FOR TRAINING A PERSON RECOGNITION MODEL USING IMAGES FROM A CAMERA, AND METHOD FOR RECOGNIZING PERSONS FROM A TRAINED PERSON RECOGNITION MODEL BY MEANS OF A SECOND CAMERA IN A CAMERA NETWORK

BACKGROUND OF THE INVENTION

The invention is based on an apparatus or a method. The present invention also relates to a computer program.

Monitoring systems for observing one or more monitoring areas are known, wherein at least one or a plurality of monitoring cameras is/are aimed at the monitoring area(s). In this case, a conspicuous object in the monitoring area, for example a person or a vehicle, is tracked by the monitoring camera. The image sequences and/or video sequences recorded by the monitoring cameras are forwarded to a central unit, for example a monitoring center, and are evaluated there by monitoring personnel and/or in an automated manner.

DE 10 2009 055 127 A1 describes a video monitoring system for detecting and tracking a conspicuous object, wherein the object is detected on the basis of a predefined model description by means of a detection device and is tracked by a tracking device over a particular period, wherein the tracking device captures a plurality of tracking parameters and has a feedback connection to the detection device, with the result that, during repeated detection, the tracking parameters are supplied to the detection device and are taken into account for the purpose of detecting the object.

SUMMARY OF THE INVENTION

Against this background, the approach presented here is used to present a method for training a person recognition model using images from a camera, a method for recognizing persons from a trained person recognition model by means of a second camera in a camera network, also an apparatus which uses these methods, and finally a corresponding computer program according to the invention.

A person recognition model is trained and adapted using a plurality of recorded image sections from a camera in such a manner that the person detected in the image sections can also be recognized and tracked in other cameras in a camera network.

A method for training a person recognition model using images from a camera is presented, wherein the method has the following steps of:

reading in a detection signal representing a detected person within a monitoring area of at least the camera in a camera network;

collecting a plurality of image signals from the camera using the detection signal which has been read in, wherein the collected image signals represent a recorded image section from each image from the camera; and adapting the person recognition model using the collected image signals in order to recognize the detected person in an image from the camera or from an at least second camera in the camera network.

A model may be a simplified representation of a sequence or a complex relationship. The model is preferably in the form of an artificial neural network, wherein the artificial neurons are arranged and connected in a predetermined network architecture, wherein the connections are used to interchange information. In this case, provision is made for the intensity of the flow of information between two neurons to be able to be changed by means of weighting. The weights of the connections of the neural network are preferably changed when adapting the model. A camera may be a photographic apparatus which can record static or moving images on a photographic film or electronically on a magnetic video tape or a digital storage medium or can transmit them via an interface. A camera network may be a networked security system having a plurality of cameras which are arranged in a stationary manner and are used to monitor a monitoring area. A monitoring area may be a defined, usually public, area or space, for example in an airport or a train station, which is monitored by a camera network in order to sustainably improve the security situation through the preventive and repressive effect of the video monitoring. An image section may be a section of a scene which is recorded in the photographic image.

The advantages of the method approach presented here are, in particular, the fact that, by determining at least one control parameter for active camera control, a person recognition model can be trained in such a manner that an available volume of data relating to a detected person in a monitoring area is artificially enriched. More robust and illumination-invariant features for person recognition can be generated on the basis of this artificially enriched volume of data. As a result, a detected person can be seamlessly tracked by an entire camera network, for example, without the person's identity being lost or the person being mixed up with another person being tracked. Furthermore, the use of an intelligent video and/or image content analysis facilitates the monitoring of critical facilities, for example of train stations, airports and public places, since intelligent algorithms automatically detect persons in the scene and can track them over time. The monitoring system can therefore automatically warn the security personnel if a person is in a critical or sensitive area, for example, or another deviation from the normal behavior is detected.

According to one embodiment, an extracting step can be used to extract specific personal features of the detected person from the collected image signals, in particular wherein an identifier for identifying the person is assigned to the specific personal features, and wherein the specific personal features are output to the camera or to the second camera in the camera network in the adapting step. On the basis of this assignment information from specific personal features linked to the identifier, a particular person can be clearly and seamlessly tracked and identified using the entire camera network for monitoring a critical area.

According to one embodiment, a determining step can be used to determine a control parameter for adjusting a recording property of the camera or of the second camera, preferably using a collected image section, in particular wherein the determined control parameter can be used to record at least one further image signal in the collecting step. In this case, the control parameter is primarily used to adapt the recorded image section or the image section to be recorded to the currently measured lighting conditions of the recorded scene or the scene to be recorded and exactly this can be adapted on the basis of lighting conditions to be expected in future. The various requirements in rapidly changing scenes are met by predictively controlling the camera or the second camera by means of the control parameter. The camera or the second camera is preferably adjusted using the determined control parameters. In particular, the control parameters are gradually and/or randomly varied in predetermined adjustment ranges and the image sections are therefore recorded.

According to one embodiment, a brightness and/or a contrast and/or a color representation can be identified as the control parameter in the determining step. The data variability is increased by using or adapting the recorded image section or the image section to be recorded with regard to illumination, contrast and color representation, which improves the person recognition model. As an alternative or in addition to the varied control parameters, the infrared band-elimination filter of the camera is preferably deactivated and the image section is recorded with the infrared band-elimination filter deactivated and is used to adapt the person recognition model.

According to one embodiment, the image sections of image signals can be collected along a movement trajectory of the detected person in the collecting step. In this case, the image sections recorded along the movement trajectory are selected so as to extract specific features of the person from these image sections, which features can also be used to uniquely assign the detected person in other cameras in a camera network.

A method for recognizing persons from a trained person recognition model by means of a camera or a second camera in a camera network is presented, wherein the method has the following steps:

the steps corresponding to a method for training a person recognition model using images from a camera;

capturing at least one second image signal, wherein the second image signal represents a second image section from an image from the camera or from the second camera; and recognizing a detected person in the second image signal which has been read in by means of the camera or the second camera in the camera network using the person recognition model.

According to one embodiment, in the steps corresponding to the method for training a person recognition model using images from a camera, the specific personal features of the detected person in the collected image signals can be output to the camera or to the second camera, wherein the person already detected by the first camera is likewise recognized by means of the specific personal features in the second image signal which has been read by the camera itself or the second camera in the recognizing step. On the basis of this assignment information from specific personal features linked to an identifier, a particular person can be clearly and seamlessly tracked and identified using the entire camera network for monitoring a critical area.

According to one embodiment, in the steps corresponding to the method for training a person recognition model using images from a camera, a determined control parameter can be output to the camera or to the second camera, wherein the determined control parameter is applied to the second image section captured by the camera or the second camera in the capturing step. The various requirements in rapidly changeable scenes are reliably met by predictively controlling the camera by means of the control parameter, and a person already detected by the first camera can also be uniquely identified by the second camera in the camera network.

According to one embodiment, in the method for training a person recognition model and/or in the method for recognizing persons from a trained person recognition model by means of a second camera in a camera network, the first camera and the second camera in the camera network can be connected to a computer unit, in particular wherein the collecting step and/or the recognizing step is/are carried out on the computer unit. In this case, the plurality of image sections recorded by the first camera and/or the second camera are collected on the computer unit in order to train the person recognition model on the basis of the personal features extracted from the image sections.

One or more of the methods presented here can be implemented, for example, in software or hardware or in a mixed form of software and hardware, for example in an apparatus or a control unit.

The approach presented here also provides an apparatus which is designed to carry out, control and/or implement the steps of a variant of a method presented here in corresponding devices. The object on which the invention is based can also be quickly and efficiently achieved by means of this embodiment variant of the invention in the form of an apparatus.

For this purpose, the apparatus may have at least one computing unit for processing signals or data, at least one storage unit for storing signals or data, at least one interface to a sensor or an actuator for reading in sensor signals from the sensor or for outputting data or control signals to the actuator, and/or at least one communication interface for reading in or outputting data which are embedded in a communication protocol. The computing unit may be, for example, a signal processor, a microcontroller or the like, wherein the storage unit may be a flash memory, an EEPROM or a magnetic storage unit. The communication interface may be designed to read in or output data in a wireless and/or wired manner, wherein a communication interface which can read in or output wired data can read in these data electrically or optically from a corresponding data transmission line, for example, or can output them to a corresponding data transmission line.

In the present case, an apparatus can be understood as meaning an electrical device which processes sensor signals and outputs control and/or data signals on the basis thereof. The apparatus may have an interface which may be designed using hardware and/or software. In the case of a hardware design, the interfaces may be part of a so-called system ASIC, for example, which comprises a wide variety of functions of the apparatus. However, it is also possible for the interfaces to be separate integrated circuits or to at least partially comprise discrete components. In the case of a software design, the interfaces may be software modules which are present, for example, on a microcontroller in addition to other software modules.

A computer program product or computer program having program code which can be stored on a machine-readable, in particular on a non-volatile machine-readable, carrier or storage medium such as a semiconductor memory, a hard disk store or an optical memory and is used to carry out, implement and/or control the steps of the method according to one of the embodiments described above, in particular if the program product or program is executed on a computer or an apparatus, is also advantageous.

BRIEF DESCRIPTION OF THE DRAWINGS

Exemplary embodiments of the approach presented here are illustrated in the drawings and are explained in more detail in the following description. In the drawings:

FIG. 3 shows an illustration for explaining the meaning of active camera control using a control parameter during person recognition according to one exemplary embodiment;

FIG. 4 shows an illustration for explaining the meaning of active camera control using a control parameter during person recognition according to one exemplary embodiment;

DETAILED DESCRIPTION

In the following description of favorable exemplary embodiments of the present invention, identical or similar reference signs are used for the elements which are illustrated in the various figures and have a similar effect, in which case a repeated description of these elements is dispensed with.

Figure 1:
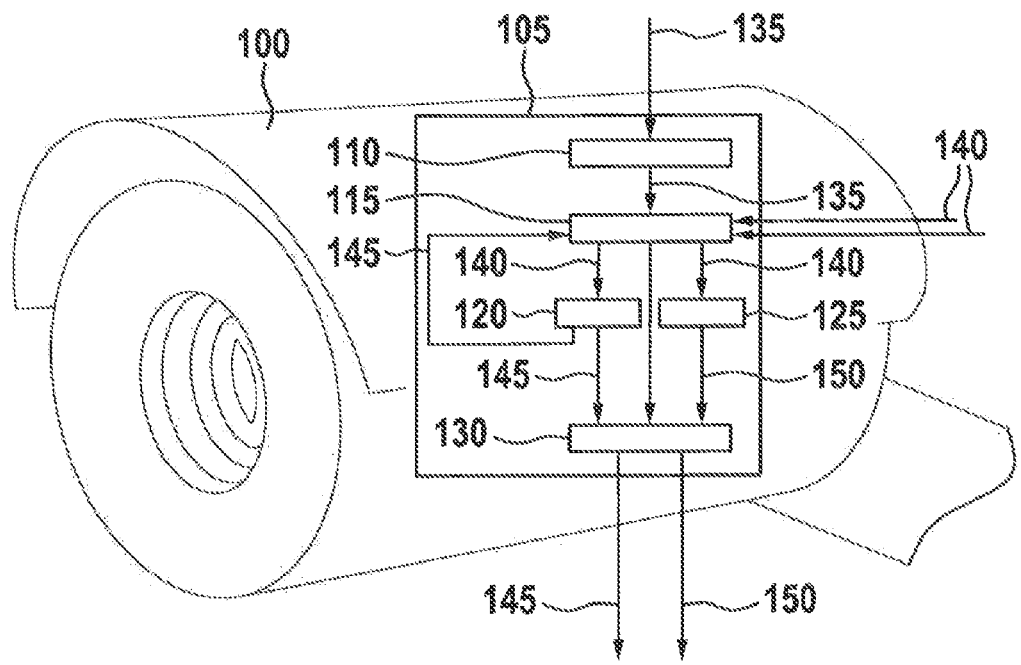
FIG. 1 shows a schematic illustration of a first camera having an apparatus for training a person recognition model using images from a camera according to one exemplary embodiment.

FIG. 1 shows a schematic illustration of a first camera 100 having an apparatus 105 for training a person recognition model using images from a camera 100 according to one exemplary embodiment. The apparatus 105 for training a person recognition model has a reading-in device 110, a collection device 115, a determination device 120, an extraction device 125 and an adaptation device 130.

The reading-in device 110 is designed to read in a detection signal 135, wherein the detection signal 135 represents a detected person within a monitoring area at least of the camera 100 in a camera network. The collection device 115 is designed to read in a plurality of image signals 140 from the camera 100 and to collect them using the detection signal 135 which has already been read in by the reading-in device 110, wherein the collected image signals 140 represent a recorded image section from each image from the camera 100. The collection device 115 is also designed to collect the image sections of the image signals 140 along a movement trajectory of the detected person. According to one exemplary embodiment, the image signals 140 may likewise be collected on an externally arranged computer unit to which the camera 100 is connected. The determination device 120 is designed to determine a control parameter 145 for adjusting a recording property of the camera 100 using the collected image signals 140 and an image section represented by the image signals 140. In this case, a brightness and/or a contrast and/or a color representation can be identified as the control parameter 145. In this case, the collection device 115 is then also designed to use the identified control parameter 145 to record at least one further image signal 140. The extraction device 125 is designed to extract specific personal features 150 of the detected person from the collected image signals 140. In this case, an identifier for identifying the person is also assigned to the specific personal features 150. Finally, the adaption device 130 is designed to adapt the person recognition model using the collected image signals 140 in order to recognize the detected person in an at least second camera in the camera network. In this case, the adaptation device 130 is also designed to previously output the specific personal features 150 and the control parameter 145 to a second camera in the camera network.

Figure 2:
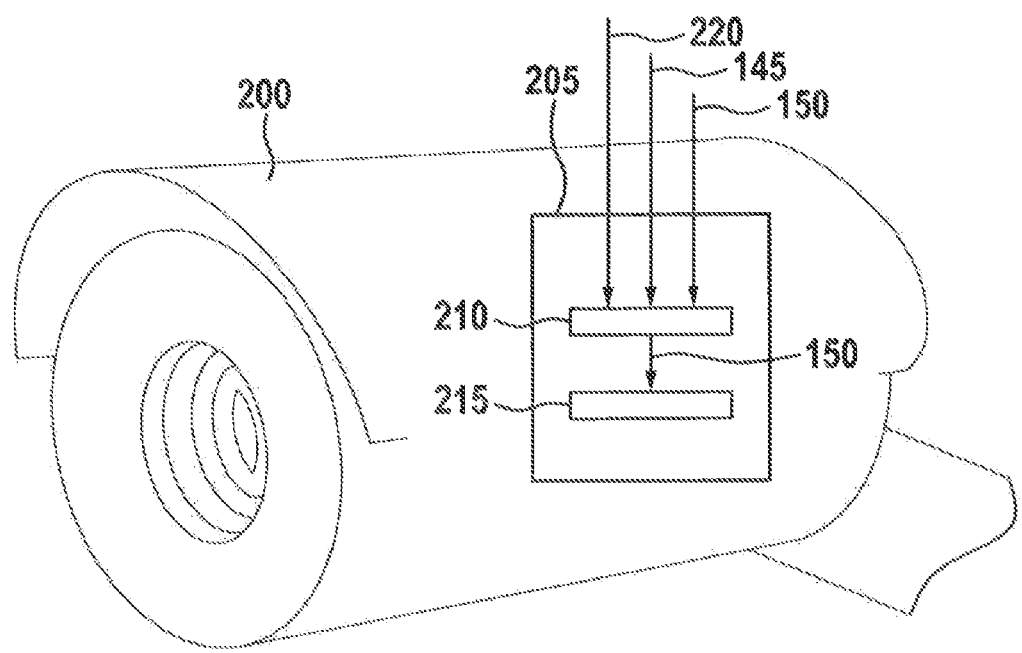
FIG. 2 shows a schematic illustration of a second camera having an apparatus for recognizing persons from a trained person recognition model according to one exemplary embodiment.

FIG. 2 shows a schematic illustration of a second camera 200 having an apparatus 205 for recognizing persons from a trained person recognition model according to one exemplary embodiment. The apparatus 205 for recognizing persons from a trained person recognition model by means of a second camera 200 in a camera network has a capture device 210 and a recognition device 215.

The capture device 210 is designed to capture at least one second image signal 220, wherein the second image signal 220 represents a second image section from an image from the second camera 200. In this case, the capture device 210 is also designed to capture the determined control parameter 145 and to apply it to the captured second image section, wherein the determined control parameter 145 for adjusting a recording property of the second camera 200 using a collected image section is output to the second camera 200 by the adaptation device of the apparatus for training a person recognition model from FIG. 1. Finally, the capture device 210 is designed to capture the extracted specific personal features 150. The recognition device 215 is designed to recognize a detected person in the second image signal 220 which has been read in by means of the second camera 200 in the camera network using the person recognition model. In this case, the recognition device 215 is designed, in particular, to recognize the detected person on the basis of the specific personal features 150 from the captured second image signal 220, wherein the specific personal features 150 for recognizing the detected person from the collected image signals are output to the second camera 200 by the adaptation device of the apparatus for training a person recognition model from FIG. 1. According to one exemplary embodiment, the detected person can likewise be recognized on the basis of the specific personal features from the captured second image signal 220 on an externally arranged computer unit to which the second camera 200 is connected.

FIG. 3 shows an illustration for explaining the meaning of active camera control using a control parameter during person recognition according to one exemplary embodiment. In this case, the illustration has four recorded image sections 305, 310, 315, 320 which are recorded by a camera without active camera control at four different times.

A person 325 who is detected by the camera and is tracked along a movement trajectory 330 over a particular period can be seen in the image sections 305, 310, 315, 320. In order to now train a model which can be used for person recognition, a plurality of image sections 305, 310, 315, 320 of the detected person 325 are selected and collected along the movement trajectory 330 of the person 325 in order to extract or learn specific features of the person 325 from these collected image sections 305, 310, 315, 320. The enlarged left-hand image 340 shows a superimposed overall scene of the four image sections 305, 310, 315, 320 which have been recorded and collected. The four image sections 305, 310, 315, 320 were each recorded at four different times, wherein the image section 305 was recorded first at the time t−3, followed by the image section 310 at the time t−2, followed by the image section 315 at the time t−1. The image section 320, recorded at the time t, shows the most up-to-date image section.

FIG. 3 also illustrates a function 345 relating to the camera control activity, the x axis of which indicates a brightness parameter and the y axis of which indicates a time profile according to one exemplary embodiment. In this case, the graph 350 of the function 345 indicates inactivity of the camera control, wherein it becomes clear that the graph 350 is represented as a straight line along the time profile since the camera control is consistently constant for all four image sections 305, 310, 315, 320.

As can be seen in FIG. 3, the image sections 305, 310, 315, 320 are identical. Only a limited number of image sections of the person 325 can therefore be used in a camera which does not have any active camera control since the variability in the data is low, in particular in scenes with constant illumination. Accordingly, the three image sections 310, 315, 320 are crossed out since these additional image sections 310, 315, 320 at the times t−2, t−1 and t do not provide any added value. Only the image section 305 at the time t−3 can therefore be used. Conventional constant camera control assumes that the scene does not change substantially from image to image. The control parameter of the camera, which is calculated for the visible scene in FIG. 3, is therefore assumed to remain valid for the next images. However, this assumption loses its validity in some applications in which rapidly changeable scenes occur, for example when tracking a fugitive. During conventional camera control, there is therefore a lagging behind, with the result that the image sensor of the camera can no longer correctly reproduce the changing lighting conditions.

Furthermore, there are problems with intermittent disturbance events, for example a group of people walking past in front of the camera. There is therefore a need for active camera control which allows a satisfactory implementation of the recorded scene in an image section even in the case of rapidly changeable scenes.

Another problem is that great differences in the point of view and illumination over different camera views can greatly change the appearance of the person 325, which makes it difficult to identify the persons 325 again in further cameras in a camera network. The important challenge lies in the high variability in the person's appearance on account of different lighting conditions and/or different camera views and/or concealment of the persons 325 and/or an only occasionally rotationally symmetrical appearance of the person 325 and on account of training data which are available only to a limited extent in order to generate a robust model.

FIG. 4 shows an illustration for explaining the meaning of active camera control using a control parameter during person recognition according to one exemplary embodiment. In this case, the illustration has four recorded image sections 305, 310, 315, 320 which have been recorded by a camera with active camera control at four different times.

A person 325 who is detected by the camera and is tracked along a movement trajectory 330 over a particular period can be seen in the image sections 305, 310, 315, 320. The enlarged left-hand image 340 shows a superimposed overall scene of the four image sections 305, 310, 315, 320 which have been recorded and collected. The four image sections 305, 310, 315, 320 were each recorded at four different times, wherein the image section 305 was recorded first at the time t−3, followed by the image section 310 at the time t−2, followed by the image section 315 at the time t−1. The image section 320, recorded at the time t, shows the most up-to-date image section.

FIG. 4 also illustrates a function 345 relating to the camera control activity, the x axis of which indicates a brightness parameter and the y axis of which indicates a time profile according to one exemplary embodiment. In this case, the graph 350 of the function 345 indicates activity of the camera control, wherein it becomes clear that the camera control is actively changed over the time profile for each of the four recorded image sections 305, 310, 315, 320.

If the person 325 enters the field of vision of the camera in the camera network for the first time, the plurality of image sections 305, 310, 315, 320 of this person 325 are stored and collected in a computer unit or a collection device of the apparatus for training the person recognition model, wherein specific personal features of the person 325 are extracted from these collected image sections 305, 310, 315, 320. A unique identifier is also assigned to these specific personal features, wherein the identifier may be a combination of numbers and/or a combination of letters. A person recognition model is trained and adapted on the basis of these personal data in order to recognize the same person 325 in another camera in the camera network and to link said person to the originally allocated specific personal features and the identifier.

Active camera control is used to change a recording property of the camera in each recorded image section 305, 310, 315, 320 using a determined control parameter, with the result that new data for training the person recognition model are generated at times t−2, t−1 and t. The control parameter may be a parameter for adapting a brightness and/or a contrast and/or a color representation to the image sections 305, 310, 315, 320. It can be clearly seen that the person's clothing at least changes its color in FIG. 4 since the color representation is influenced by the camera control.

Actively controlling the camera control also makes it possible to considerably increase the data variability along the movement trajectory 330 of the person 325. As a result of the artificially enriched data, more robust person recognition models can be trained using neural networks or the number of image sections 305, 310, 315, 320 in a computer unit for the person 325 can be decisively increased. Actively controlling the camera control has a direct effect on the representation of the camera image. Useful data enrichment can no longer be carried out as a result of the active camera control being interrupted, which would considerably reduce the person recognition accuracy.

Modern cameras can also be controlled in such a manner that they change over to a special night mode. In this mode, although there is a changeover to grayscale images, the infrared band-elimination filter is deactivated. This has the advantage that wavelengths which are invisible to the person are also recorded in the images. These recordings then have appearance-based properties of the person 325 which cannot be perceived by the person but constitute an additional item of information for person recognition and therefore increase the information content.

Figure 5:
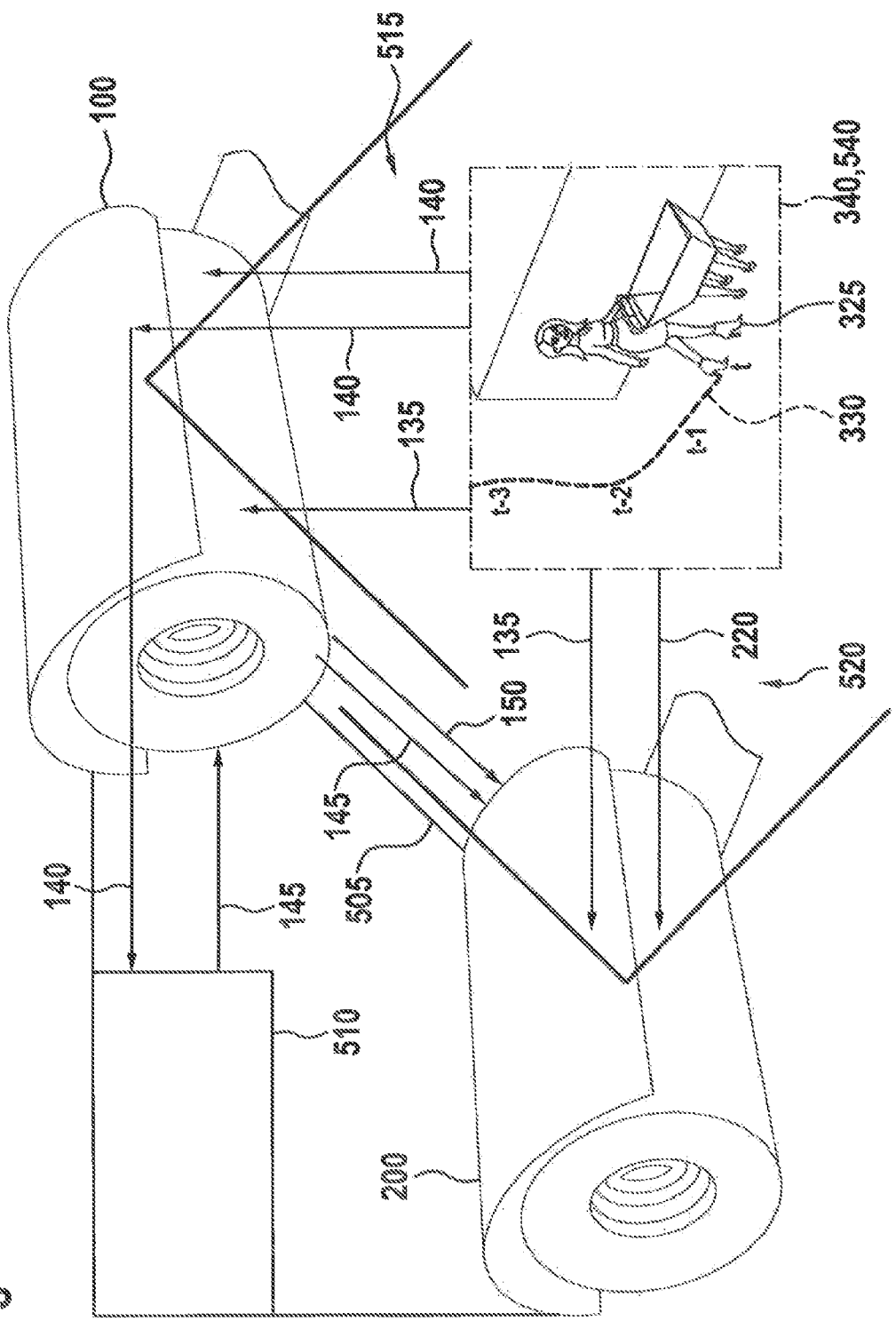
FIG. 5 shows a simplified system structure for using a method for training a person recognition model and a method for recognizing persons from a trained person recognition model according to one exemplary embodiment.

FIG. 5 shows a simplified system structure for using a method for training a person recognition model and a method for recognizing persons from a trained person recognition model according to one exemplary embodiment. The system structure has the first camera 100 and the second camera 200 which are arranged and are connected to one another in a camera network 505, as well as an externally arranged computer unit 510 to which the first camera 100 and the second camera 200 are connected.

Both the first camera 100 and the second camera 200 are aimed at a first monitoring area 515 to be monitored and a second monitoring area 520 to be monitored. A conspicuous person 325 is respectively detected in this first monitoring area 515 and in this second monitoring area 520 using a detection signal 135 and is tracked by the first camera 100 and by the second camera 200 on the basis of a movement trajectory 330 of the person 325. The first camera 100 records a plurality of image signals 140, wherein the image signals 140 represent a plurality of image sections from an image 340 from the first camera 100. In this case, the image sections are recorded along the tracked movement trajectory 330 of the person 325. The recorded image sections are forwarded to the externally arranged computer unit 510 where the image sections are stored and collected. A control parameter 145 for adjusting a recording property of the camera 100 is determined using the collected image sections. In this case, a brightness and/or a contrast and/or a color representation is/are determined as the control parameter 145. The determined control parameter 145 is then used to record at least one further image signal 140. In addition to determining the control parameter 145, specific personal features 150 of the person 325 are extracted using the collected image sections and a unique identifier is assigned to the person 325. A person recognition model is now trained and adapted on the basis of these personal data in order to likewise recognize the same person 325 in the second camera 200 in the camera network 505 and to link said person to the originally allocated specific personal features 150 and the identifier as soon as the person 325 is in the monitoring area 520 of the second camera 200. For this purpose, the control parameter 145 and the specific features 150 of the detected person 325 are output to the second camera 200 in the camera network 505. The second camera 200 captures a second image signal 220 representing a second image section from an image 540 from the second camera 200. The determined control parameter 145 is applied to the second image section and the specific personal features 150 of the detected person 325 are identified in the second image signal 220 which has been read in. The detected person 325 is therefore uniquely identified by the second camera 200 using the person recognition model.

It is also conceivable for the second image signal 220 to be recorded by the first camera 100 (for example at a later time) and to be used to recognize the person in the area monitored by the first camera 100 (at the corresponding later time). It is therefore not absolutely necessary to adapt the model only if a person is recognized in an image captured by the second camera 200 using the data from the camera 100, but rather the adaptation of the model can also be used again to recognize persons from image sections of images captured by the camera 100.

Figure 6:
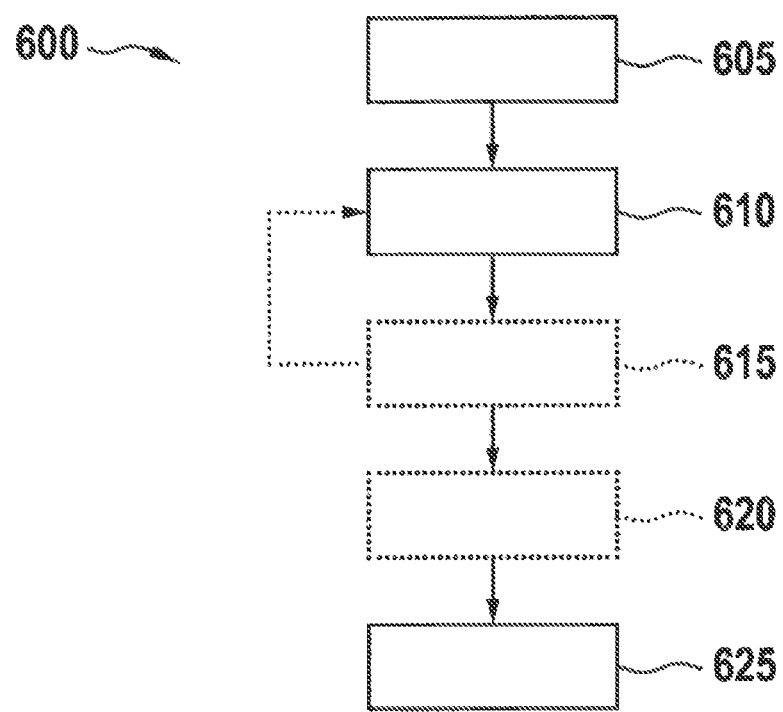
FIG. 6 shows a flowchart of an exemplary embodiment of a method for training a person recognition model using images from a camera according to one exemplary embodiment.

FIG. 6 shows a flowchart of an exemplary embodiment of a method 600 for training a person recognition model using images from a camera according to one exemplary embodiment. The method 600 can be used using the apparatus presented in FIG. 1 for training a person recognition model using images from a camera.

The method 600 first of all has a step 605 in which a detection signal representing a detected person within a monitoring area of at least the camera in a camera network is read in. The method 600 then has a step 610 in which a plurality of image signals from the camera are collected using the detection signal which has been read in, wherein the collected image signals represent a recorded image section from each image from the camera. The image sections of the image signals are collected in this case along a movement trajectory of the detected person. According to one exemplary embodiment, step 610 can likewise be carried out on an externally arranged computer unit. In a step 615 of the method 600, a control parameter for adjusting a recording property of the camera using a collected image section is determined. In this case, a brightness and/or a contrast and/or a color representation can be identified as the control parameter. Step 610 of the method 600, in particular, can then be carried out again in order to use the determined control parameter to record at least one further image signal. In a further step 620 of the method 600, specific personal features of the detected person are extracted from the collected image signals, in particular wherein an identifier for identifying the person is assigned to the specific personal features. Finally, the method 600 has a step 625 in which the person recognition model is adapted using the collected image signals in order to recognize the detected person in an image from the camera or from an at least second camera in the camera network, wherein the specific personal features are likewise output to the camera or to the second camera in the camera network in step 625.

Figure 7:
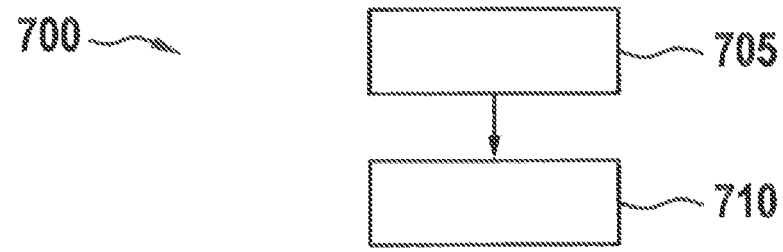
FIG. 7 shows a flowchart of an exemplary embodiment of a method for recognizing persons from a trained person recognition model according to one exemplary embodiment.

FIG. 7 shows a flowchart of an exemplary embodiment of a method 700 for recognizing persons from a trained person recognition model according to one exemplary embodiment. The method 700 can be used using the apparatus presented in FIG. 2 for recognizing persons from a trained person recognition model. Before the method 700 for recognizing persons from a trained person recognition model can be carried out, it is necessary to carry out the steps of the method for training a person recognition model from FIG. 6.

The method 700 first of all has a step 705 in which at least one second image signal is captured, wherein the second image signal represents a second image section from an image from the camera or from the second camera. In this case, the control parameter determined in the previous method for training a person recognition model is to be output to the camera or to the second camera, with the result that the determined control parameter can also be applied to the captured second image section in step 705 of the method 700. Finally, the method 700 has a step 710 in which the detected person is recognized in the second image signal which has been read in by the camera or the second camera in the camera network using the person recognition model. In this case, the specific personal features of the detected person in the collected image signals in the previous method for training a person recognition model are to be output to the camera or to the second camera, with the result that the specific personal features of the detected person can also be identified in the second image signal which has been read in in step 710 of the method 700.

According to one exemplary embodiment, step 710 can likewise be carried out on an externally arranged computer unit.

If an exemplary embodiment comprises an "and/or" conjunction between a first feature and a second feature, this should be read such that the exemplary embodiment has both the first feature and the second feature according to one embodiment and has either only the first feature or only the second feature according to another embodiment.

The invention claimed is:

1. A method (600) for training a person recognition model using images from a camera (100), the method (600) comprising:
   reading in (605) a detection signal (135) representing a detected person (325) within a monitoring area (515) of a first camera (100) in a camera network (505);
   collecting (610) a plurality of image signals (140) from the first camera (100) using the detection signal (135) which has been read in, wherein the collected image signals (140) represent a recorded image section (305, 310, 315, 320) from each image (340) from the camera (100), wherein the image sections (305, 310, 315, 320) of image signals (140) are collected along a movement trajectory (330) of the detected person (325) in the collecting step (610), wherein each image section of the image sections (305, 310, 315, 320) is collected at a different time than the other image sections, wherein the collecting (610) of the plurality of image signals (140) includes controlling the first camera (100) by randomly varying a control parameter of the first camera (100) within a predetermined adjustment range, and wherein the control parameter (145) includes at least one of a group consisting of a brightness, a contrast, and a color representation; and adapting (625) the person recognition model using the collected image signals (140) in order to recognize the detected person (325) in an image from the first camera (100) or in an image from the second camera (200) in the camera network (505).

2. The method (600) according to claim 1, of the method further comprising extracting (620) specific personal features (150) of the detected person (325) from the collected image signals (140), wherein the specific personal features (150) are output to the first camera (100) or to the second camera (200) in the camera network (505) in the adapting step (625).

3. The method (600) according to claim 1, wherein the first camera (100) and the second camera (200) in the camera network (505) are connected to a computer unit (510), wherein the collecting step (610) and/or the recognizing step (710) is/are carried out on the computer unit (510).

4. A method (700) for recognizing persons from a trained person recognition model, the method (700) comprising:

reading in (605) a detection signal (135) representing a detected person (325) within a monitoring area (515) of a first camera (100) in a camera network (505);

collecting (610) a plurality of image signals (140) from the first camera (100) using the detection signal (135) which has been read in, wherein the collected image signals (140) represent a recorded image section (305, 310, 315, 320) from each image (340) from the first camera (100), wherein the image sections (305, 310, 315, 320) of image signals (140) are collected along a movement trajectory (330) of the detected person (325) in the collecting step (610), wherein each image section of the image sections (305, 310, 315, 320) is collected at a different time than the other image sections, wherein the collecting (610) of the plurality of image signals (140) includes controlling the first camera (100) by randomly varying a control parameter of the first camera (100) within a predetermined adjustment range, and wherein the control parameter (145) includes at least one of a group consisting of a brightness, a contrast, and a color representation;

adapting (625) the person recognition model using the collected image signals (140) in order to recognize the detected person (325) in an image from the at least one camera (100) or in an image from the second camera (200) in the camera network (505);

capturing (705) at least one second image signal (220), wherein the second image signal (220) represents a second image section from an image (540) from the first camera (100) or from the second camera (200); and recognizing (710) a detected person (325) in the second image signal (220) which has been read in by means of the first camera (100) or the second camera (200) in the camera network (505) using the person recognition model.

5. The method (700) according to claim 4, in which, the specific personal features (150) of the detected person (325) in the collected image signals (140) are output to the first camera or to the second camera (200), wherein the specific personal features (150) are recognized in the second image signal (220) which has been read in in the step of recognizing (710) the detected person (325).

6. The method (700) according to claim 4, in which, the determined control parameter (135) is output to the first camera or to the second camera (200), wherein the determined control parameter (145) is applied to the captured second image section in the capturing step (705).

7. An apparatus (105; 205) comprising a computer, wherein the computer is configured to read (605) a detection signal (135) representing a detected person (325) within a monitoring area (515) of a first camera (100) in a camera network (505);

collect (610) a plurality of image signals (140) from the first camera (100) using the detection signal (135) which has been read in, wherein the collected image signals (140) represent a recorded image section (305, 310, 315, 320) from each image (340) from the camera (100), wherein the image sections (305, 310, 315, 320) of image signals (140) are collected along a movement trajectory (330) of the detected person (325) in the collecting step (610), wherein each image section of the image sections (305, 310, 315, 320) is collected at a different time than the other image sections, wherein the collecting (610) of the plurality of image signals (140) includes controlling the first camera (100) by randomly varying a control parameter of the first camera (100) within a predetermined adjustment range, and wherein the control parameter (145) includes at least one of a group consisting of a brightness, a contrast, and a color representation; and adapt (625) the person recognition model using the collected image signals (140) in order to recognize the detected person (325) in an image from the first camera (100) or in an image from the second camera (200) in the camera network (505).

8. A non-transitory, computer-readable medium containing computer-executable instructions that when executed by the computer cause the computer to read in (605) a detection signal (135) representing a detected person (325) within a monitoring area (515) of a first camera (100) in a camera network (505);

collect (610) a plurality of image signals (140) from the first camera (100) using the detection signal (135) which has been read in, wherein the collected image signals (140) represent a recorded image section (305, 310, 315, 320) from each image (340) from the first camera (100), wherein the image sections (305, 310, 315, 320) of image signals (140) are collected along a movement trajectory (330) of the detected person (325) in the collecting step (610), and wherein each image section of the image sections (305, 310, 315, 320) is collected at a different time than the other image sections, wherein the collecting (610) of the plurality of image signals (140) includes controlling the first camera (100) by randomly varying a control parameter of the first camera (100) within a predetermined adjustment range, and wherein the control parameter (145) includes at least one of a group consisting of a brightness, a contrast, and a color representation;

adapt (625) the person recognition model using the collected image signals (140) in order to recognize the detected person (325) in an image from the at least one camera (100) or in an image from the second camera (200) in the camera network (505);

capture (705) at least one second image signal (220), wherein the second image signal (220) represents a second image section from an image (540) from the first camera (100) or from the second camera (200); and recognize (710) a detected person (325) in the second image signal (220) which has been read in by means of the first camera (100) or the second camera (200) in the camera network (505) using the person recognition model.

9. A method (600) for training a person recognition model using images from a camera (100), the method (600) comprising:

reading in (605) a detection signal (135) representing a detected person (325) within a monitoring area (515) of a first camera (100) in a camera network (505);

collecting (610) a plurality of image signals (140) from the first camera (100) using the detection signal (135) which has been read in, wherein the collected image signals (140) represent a recorded image section (305, 310, 315, 320) from each image (340) from the camera (100), wherein the collecting (610) of the plurality of image signals (140) includes controlling the first camera (100) by randomly varying a control parameter of the first camera (100) within a predetermined adjustment range, and wherein the control parameter (145) includes at least one of the group consisting of a brightness, a contrast, and a color representation;

and adapting (625) the person recognition model using the collected image signals (140) in order to recognize the detected person (325) in an image from the first camera (100) or in an image from the second camera (200) in the camera network (505).

10. The method (600) according to claim 9, wherein the control parameter is a parameter for adapting a brightness to the image sections (305, 310, 315, 320).

11. The method (600) according to claim 9, wherein the control parameter is a parameter for adapting a contrast to the image sections (305, 310, 315, 320).

12. The method (600) according to claim 9, wherein the control parameter is a parameter for adapting a color representation to the image sections (305, 310, 315, 320).

\* \* \* \* \*